United States Patent [19]
Beckers

[11] 3,900,524
[45] Aug. 19, 1975

[54] STABILIZED METHYLENE CHLORIDE
[75] Inventor: Norman L. Beckers, Humble, Tex.
[73] Assignee: Diamond Shamrock Corporation, Cleveland, Ohio
[22] Filed: May 13, 1974
[21] Appl. No.: 469,360

Related U.S. Application Data
[63] Continuation-in-part of Ser. No. 335,004, Feb. 23, 1973, abandoned, and a continuation-in-part of Ser. No. 335,368, Feb. 23, 1973, abandoned.

[52] U.S. Cl........... 260/652.5 R; 252/171; 252/364; 252/390
[51] Int. Cl. ............................................ C07c 17/42
[58] Field of Search .............................. 260/652.5 R

[56] References Cited
UNITED STATES PATENTS
2,981,759   4/1961   Cole, Jr. et al. ............. 260/652.5 R
3,314,892   4/1967   Graham ....................... 260/652.5 R Primary Examiner—D. Horwitz
Attorney, Agent, or Firm—William A. Skinner

[57]  ABSTRACT

Methylene chloride stabilized by admixture with diisopropylamine, N-methyl pyrrole, butylene oxide and propylene oxide. The composition is useful in metal degreasing.

2 Claims, No Drawings

STABILIZED METHYLENE CHLORIDE

CROSS REFERENCE TO RELATED APPLICATIONS

This is a continuation-in-part of copending applications Ser. No. 335,004 and Ser. No. 335,368, both filed Feb. 23, 1973 and both now abandoned.

BACKGROUND OF THE INVENTION

Methylene chloride is a highly versatile and useful solvent for various industrial applications at both normal and elevated temperatures. A particularly important industrial use is the vapor degreasing of metals. Methylene chloride is known to be more stable than other chlorinated hydrocarbon solvents such as perchloroethylene, trichloroethylene and methyl chloroform when the solvents are used in unstabilized condition. For example, methylene chloride is more resistant to oxidation, hydrolysis and pyrolysis than other chlorinated solvents and does not substantially react with aluminum in the aluminum scratch test commonly used to indicate unstabilized or minimally stabilized methyl chloroform.

In addition, methylene chloride may be used to greater advantage in vapor degreasing of metals than other known degreasing solvents since it may be used effectively at lower temperatures due to its lower boiling point and excellent stability. Methylene chloride is particularly desirable for such degreasing operations since it is substantially resistant to photochemical activity and therefore does not contribute to air pollution by smog formation.

However, methylene chloride when used in various metal cleaning functions, including vapor degreasing, suffers the disadvantage of being reactive with aromatic and aliphatic compounds in the presence of metals, metal halides and combinations thereof, including aluminum, zinc and iron, halides thereof, and combinations of said metals and halides. Objectionable high boiling tarry substances are produced which render the methylene chloride unsuitable for further use. Aliphatic and aromatic organic compounds of this nature and metals such as aluminum, iron and zinc, their halides and combinations are generally introduced into the methylene chloride from various cutting oils and lubricants used in metal fabricating operations, which are carried over into the methylene chloride solvent during vapor degreasing or other cleaning of the fabricated metal parts. Solvent manufacturing, handling and storage equipment is another source for introduction of such impurities. To prevent degradation and other types of deterioration such as oxidation, hydrolysis and pyrolysis which may occur in some instances, it has been the practice to incorporate minor quantities of various organic compounds into methylene chloride, which compounds act as stabilizers to substantialy prevent such degradation. It is desirable to provide methylene chloride stabilized to effectively prevent degradation in various applications, and the demand still exists for a low cost stabilized methylene chloride composition that can be easily prepared and which provides optimum stabilization under may different operating conditions.

SUMMARY OF THE INVENTION

An object of this invention is to provide a stabilized methylene chloride containing diisopropylamine, N-methyl pyrrole, butylene oxide, and propylene oxide which prevents deterioration or degradation of the methylene chloride in association with metals, metal halides and combinations including aluminum, iron and zinc, halides of said metals and aromatic or aliphatic organic compounds capable of reacting with these metals, metal halides and combinations thereof.

A further object of this invention is to provide a stabilized methylene chloride composition in which the stabilizers are low in cost and capable of being incorporated with ease into the methylene chloride.

A still further object of this invention is to provide a process for the degreasing of metals by contacting the metals with methylene chloride stabilized to prevent degradation of the methylene chloride in the presence of metals, metal halides and combinations thereof including aluminum, iron and zinc, halides of said metals and combinations and aromatic or aliphatic organic compounds which react with the metals, metal halides and combinations thereof.

These and additional objects of the present invention will become apparent to those skilled in the art from the description and claims which follows.

DESCRIPTION OF THE PREFERRED EMBODIMENTS

The objects set forth above have been found to be attained by providing a composition consisting essentially of methylene chloride containing stabilizing amounts of from about 0.001 to about 2.0 percent by weight of the methylene chloride of each of diisopropylamine, N-methyl pyrrole, butylene oxide and propylene oxide.

The quantity of the stabilizing agents useful in the practice of this invention will vary depending upon the conditions of use, the identity and quantity of other stabilizers incorporated into the methylene chloride and other practical operating considerations. Each stabilizing agent or compound may generally be used within the range of from about 0.001 to about 2.0 percent and preferably from about 0.002 to about 1.0 percent by weight of the methylene chloride. Although higher concentrations may be used, if desired, no additional benefit is obtained and the cost is unnecessarily increased. While the above composition containing stabilizing agents provides optimum prevention of degradation of the methylene chloride under a variety of operating conditions it is also possible to stabilize methylene chloride by deleting the propylene oxide depending on the stabilization required for the particular operating condition.

The stabilized composition may be used for the degreasing of metals by contacting the metals with the composition. Thus, the process for vapor degreasing metals comprises contacting the metals to be degreased with methylene chloride containing an admixture of stabilizing amounts of diisopropylamine, N-methyl pyrrole, butylene oxide and propylene oxide. In degreasing metals with the above described preferred stabilized methylene chloride in the presence of aromatic and aliphatic organic compounds which react with metals, metal halides and combinations thereof, there exists upon contact of the metal with the stabilized methylene chloride a composition comprising methylene chloride, a stabilizing amount of from about 0.001 to about 2.0 weight percent of the methylene chloride of each of diisopropylamine, N-methyl pyrrole, butylene oxide and propylene oxide, and aromatic or aliphatic organic compounds which react with said metals, metal halides and combinations. The metals, metal halides and combinations may be present from any source such as drilling or other machining of aluminum or aluminum containing materials with various working fluids such as cutting oils, lubricants and the like, or aluminum chloride may be present from the reaction of methylene chloride with aluminum. The reaction of methylene chloride in the presence of aliphatic organic compounds such as transdichloroethylene, carbon tetrachloride, and 1,1,1-trichloroethane, and aromatic compounds such as toluene, mesitylene, napthalene and the like with metals, metal halides and combinations may be inhibited by methylene chloride stabilized with the above noted amounts of diisopropylamine, N-methyl pyrrole, butylene oxide and propylene oxide.

In Example 1 of Table I, below, an aluminum reflux stability test was carried out by placing about 190 ml of substantially water-free methylene chloride and 5 percent by volume of a commercially available stabilized vapor degreasing grade 1,1,1-trichloroethane in a flat bottom 300 ml boiling flask fitted with a condenser vented to room air. One strip of aluminum about 2 × 7 cm was suspended in the condenser and about one gram of 20 mesh granular aluminum was added to the flask. During the period of reflux the solvent vapor surrounded, condensed, and dripped from the suspended strip. In Examples 2 and 3 quantities of propylene oxide, butylene oxide, diisopropylamine and N-methyl pyrrole specified in the Examples were added to the methylene chloride. The procedure of Example 1 was followed in Examples 2 and 3 with the exception that about one gram of 40 mesh granular iron was placed in the boiling flask in Example 3. The pH and acid content, as HCl, were determined from a portion of the aqueous phase obtained by extraction of the solvent with an equal volume of neutral distilled water after the system was refluxed for the indicated time.

The results of the tests are shown in Table I below.

The inhibition of the degradation of methylene chloride by the reaction between 1,1,1-trichloroethane and aluminum and metal salts by the combination of propylene oxide, butylene oxide, diisopropylamine and N-methyl pyrrole is especially surprising and unexpected when it is realized that the stabilizers included in the commercial vapor degreasing grade 1,1,1-trichloroethane to prevent reaction of the 1,1,1-trichloroethane with metal and/or metal salts in the presence of chlorinated solvents failed to inhibit the degradation of the methylene chloride. Only when the propylene oxide, butylene oxide, diisopropylamine and N-methyl pyrrole were admixed with the methylene chloride containing the stabilized 1,1,1-trichloroethane was degradation of the methylene chloride prevented.

In Examples 6 and 7 of Table II, below, the aluminum reflux stability tests were conducted by placing 200 ml of methylene chloride, 5 percent by volume of toluene and compositions containing propylene oxide, butylene oxide, diisopropylamine and N-methyl pyrrole in a 300 ml flask, adding about 0.5 grams of 20 mesh granular aluminum and suspending a bright aluminum coupon about 2 × 7 cm in a condenser fitted to the flask. The procedure of Examples 6 and 7 was followed in Example 5 except that the stabilizing components were deleted, and in Example 8 with the exception that 1 gram of 40 mesh granular iron was added to the boiling flask in place of the granular aluminum. Methylene chloride containing only the aromatic compound toluene and samples containing toluene plus the quantities of propylene oxide, butylene oxide, diisopropylamine and N-methyl pyrrole specified in the Examples were refluxed for varying time periods. In all the tests the pH and acid content, as HCl, were determined and visual observations of the aluminum condenser coupon were made at the completion of the test. The tests in Table II were conducted by venting the condenser to room air and

TABLE I

EFFECT OF ALIPHATIC ORGANIC COMPOUNDS ON ALUMINUM REFLUX STABILITY TESTS OF METHYLENE CHLORIDE

| Example | Solvent System | Volume Additive | Days Reflux | pH | Condenser Coupon Corrosion* | Color of Solvent |
|---|---|---|---|---|---|---|
| 1 | Methylene Chloride | 5% 1,1,1-Trichloroethane | ⅓ | <3 (HCl fumes) | Severe | Black |
| 2 | Methylene Chloride containing 0.075 wt. % Propylene Oxide 0.05 wt.% Butylene Oxide 0.0012 wt.% Diisopropylamine + 0.0012 N-methyl pyrrole | 5% 1,1,1-Trichloroethane | 25 | 7.5 | None | Clear & Colorless |
| 3 | Methylene Chloride containing 0.15 Wt.% Propylene Oxide 0.10 Wt.% Butylene Oxide 0.0025 Wt.% Diisopropylamine and 0.0025 Wt.% N-methyl pyrrole | 5% 1,1,1-Trichloroethane | 22 | 8.5 | None | Clear & Colorless |

*Determined by visual observation

In Example 1 of Table I deterioration of the solvent system occurred due to the reaction of aluminum with the contained aliphatic compound 1,1,1-trichloroethane. In Examples 2 and 3 of Table I the addition of the combination of propylene oxide, butylene oxide, diisopropylamine and N-methyl pyrrole prevented such deterioration.

without the addition of water. Also in Table II the pH determinations were made with a portion of the water layer obtained by extraction of the solvent with neutral distilled water equal to the volume of the solvent system.

The results of these tests are set forth in Table II below.

In Example 4 of Table II some corrosion of the condenser coupon occurred when methylene chloride was refluxed for only 3 days in the absence of toluene and stabilizing agents. Refluxing of methylene chloride in the presence of toluene and in the absence of the stabilizing composition of this invention resulted in the very rapid and complete degradation of the solvent system and severe corrosion of the condenser coupon. Substantially complete prevention of degradation of methylene chloride is shown in Examples 6 to 8 of Table II by the combination of propylene oxide, butylene oxide, diisopropylamine and N-methyl pyrrole in the presence of toluene and aluminum in Examples 6 and 7 and in the presence of toluene, aluminum and iron in Example 8.

amples. No water was added to the flask and the condenser was vented to room air in all the Examples. The pH determination was made from a portion of the aqueous phase obtained by extracting the solvent with an equal volume of neutral distilled water after the system was refluxed for the specified time period.

The results of the tests are included in Table III below.

TABLE III

PYROLYTIC STABILITY TESTS

| Example | Solvent System | Vapor Temp. °F | Hours Reflux | pH | Corrosion at Location Soxhlet | Condenser |
|---|---|---|---|---|---|---|
| 9 | Methylene Chloride | 255 | 96 | 7.0 | Slight Blisters | Slight Blisters |
| 10 | Methylene Chloride plus 0.15 Wt. % Propylene Oxide, 0.10 Wt. % Butylene Oxide, 0.0025 Wt. % Diisopropylamine and 0.0025 Wt. % N-methyl pyrrole | 260 | 96 | 8.6 | None | None |

Example 10 shows the excellent stabilizing effects of the combination of propylene oxide, butylene oxide, diisopropylamine and N-methyl pyrrole in improving resistance of methylene chloride against decomposition by high temperature when compared to the methylene chloride in Example 9 which did not contain the composition of stabilizing agents.

TABLE II

EFFECT OF AROMATIC COMPOUNDS ON ALUMINUM REFLUX STABILITY TESTS WITH METHYLENE CHLORIDE

| Example | Solvent System | Volume, Additive | Days Test | pH | Color Solvent | Condenser Coupon Corrosion |
|---|---|---|---|---|---|---|
| 4 | Methylene Chloride | 0 | 3 | 7.0 | Clear & Colorless | Blisters |
| 5 | Methylene Chloride | 5% Toluene | ⅛ | <3 HCl fumes | Orange-black | Severe |
| 6 | Methylene Chloride plus 0.075 Wt. % Propylene Oxide 0.05 Wt. % Propylene Oxide 0.0012 Wt. % Diisopropylamine 0.0012 Wt. % N-methyl pyrrole | 5% Toluene | 28 | 8.0 | Clear & Colorless | None |
| 7 | Methylene Chloride plus 0.15 Wt. % Propylene Oxide 0.10 Wt. % Butylene Oxide 0.0025 Wt. % Diisopropylamine 0.0025 Wt. % N-methyl pyrrole | 5% Toluene | 28 | 8.7 | Clear & Colorless | None |
| 8 | Methylene Chloride plus 0.15 Wt. % Propylene Oxide 0.10 Wt. % Butylene Oxide 0.0025 Wt. % Diisopropylamine 0.0025 Wt. % N-methyl pyrrole | 5% Toluene | 22 | 9.1 | Clear & Colorless | None |

In Examples 9 and 10 pyrolytic stability tests of methylene chloride and the stabilized composition of this invention, respectively, were made. About 100 ml of methylene chloride in Example 9 and about 100 ml of methylene chloride, containing the amount of stabilizing composition specified in Example 10 were placed in a 300 ml flask fitted with a Soxhlet extractor and a condenser. About 0.5 grams of 20 mesh aluminum granules were placed in the flask, an aluminum coupon, ½ × 2 × 1/64 inches was positioned halfway into the condenser tube and about a 15 inch length of 20 gauge aluminum wire was inserted into the vapor tube of the Soxhlet from the inlet to the outlet with the excess length coiled and extending downwardly to within one inch of the bottom of the Soxhlet. The flask and its contents were heated by an electric heater. The Soxhlet vapor tube was wrapped with a heating tape to heat the methylene chloride vapor above its ambient boiling point of 104°F to the temperatures specified in the Ex- In Examples 11 to 13 a modified oxidation test in accordance with MIL-T-81533A or Federal Specification o-T-634b was employed to compare the stabilizing effect of the combination of methylene chloride with proopylene oxide, butylene oxide, diisopropylamine and N-methyl pyrrole to methylene chloride without the stabilizing composition.

The Federal Specification was modified in Examples 11 to 12, respectively, by using 100 ml of the solvent and stabilized solvent system in the flasks, by placing a steel coupon and an aluminum strip both measuring 1/4 × 3/4 × 1/16 inches on the bottom of the flask, by hanging a 6 inch length of 20 gauge aluminum wire coiled in three-fourths inch diameter from an aluminum wire one inch above the liquid and by adjusting the oxygen tube to within one-fourth inch of the flask bottom so that a stream of oxygen of about one bubble per second was produced. The heat source was a frosted light bulb of 150 watts which was mounted beneath the flask. The procedure of Examples 11 and 12 was followed in Example 13 with the exception that one each of aluminum and steel coupons measuring ½ × 2 × 1/16 inches were hung one inch above the liquid in place of the aluminum wire. The results of the accelerated oxidation test are shown in Table IV below.

and allowed to stand at ambient conditions. After 16 hours no changes had taken place in the appearance of the solvent, the pH or the aluminum in each bottle. Toluene in an amount of 5 percent of volume and about 0.04 grams of anhydrous aluminum chloride were then added to each bottle, the contents stirred, changes in

TABLE IV

MODIFIED FEDERAL ACCELERATED OXIDATION TEST

| Example | Solvent System | Test Duration | pH | Color of Solvent | Condition of Metal Coupons and Wire* |
|---------|---------------|---------------|-----|------------------|--------------------------------------|
| 11 | Methylene Chloride | 72 hours | 6.3 | Very light Yellow | Aluminum coupon corroded and blistered. Steel coupon and aluminum wire not corroded or blistered. |
| 12 | Methylene Chloride plus 0.20 Wt.% Propylene Oxide 0.10 Wt.% Butylene Oxide 0.0025 Wt.% Diisopropylamine and 0.0025 Wt.% N-methyl pyrrole | 72 hours | 9.0 | Very light yellow | Metal coupons and aluminum wire not corroded or blistered. |
| 13 | Methylene Chloride plus 0.15 Wt.% Propylene Oxide 0.10 Wt.% Butylene Oxide 0.0025 Wt.% Diisopropylamine and 0.0025 Wt.% N-methyl pyrrole | 168 hours | 8.4 | Clear & colorless | Metal coupons not corroded or blistered. |

*Determined by visual observation

Examples 12 and 13 show the excellent stabilizing effects of the combination of propylene oxide, butylene oxide, diisopropylamine and N-methyl pyrrole in improving resistance of methylene chloride against decomposition by light, moisture and oxygen when compared to the methylene chloride in Example 11 which did not contain the composition of stabilizing agents.

In Examples 14 and 15, respectively, of Table V, 32 ml of substantially water free methylene chloride and methylene chloride stabilized with 0.30 wt. percent of propylene oxide, 0.20 wt. percent butylene oxide, 0.005 wt. percent of diisopropylamine and 0.005 wt. percent of N-methyl pyrrole were placed in 4 ounce glass bottles containing a 1 cm² aluminum coupon one sixty-fourth inch thick. The bottles were tightly capped and allowed to stand. After 22 hours changes in the appearance of the aluminum coupons and the solvents, and pH values of the solvents were determined and recorded. The procedure of Examples 14 and 15 was followed in Examples 16 to 20 of Table V except that 15 ml samples of the stabilized compositions were placed in glass vials. In the latter Examples various compounds reported in the prior literature to be useful in stabilizing chlorinated solvents were evaluated for their ability to stabilize methylene chloride. In Examples 16 to 20 after the tightly capped vials had been standing for 16 hours no changes had occurred in the appearance of the solvent, the pH or the aluminum coupons. The results of the tests of Examples 14 to 20 are set forth in Table V.

TABLE V

INHIBITION OF REACTION OF AROMATIC COMPOUNDS WITH METHYLENE CHLORIDE

| Example | Solvent System | Upon Addition of 5% Vol. Toluene & 0.04 grams Aluminum Chloride | After 22 Hours |
|---------|---------------|------------------------------------------------------------------|----------------|
| 14 | Methylene Chloride Containing Aluminum Coupon | Light Yellow Precipitate | Dark Orange, pH 2.8, HCl fumes |
| 15 | Methylene Chloride Containing Aluminum Coupon, Stabilized with 0.3 Wt.% Propylene Oxide, 0.2 Wt.% Butylene Oxide 0.005 Wt.% Diisopropylamine, and 0.005 Wt.% N-methyl pyrrole | Very slight Yellow Precipitate | Very slight white Precipitate, colorless, pH about 4.5 |
| 16 | Methylene Chloride Containing Aluminum Coupon, stabilized with 2.8 Wt.% Dimethoxymethane | Solution light brown purple precipitate turned purple-brown after a few minutes | Solution light gray-tan. Brown spots on aluminum coupons. Grey-white precipitate pH <3 |
| 17 | Methylene Chloride Containing Aluminum Coupon, Stabilized with 0.7 Wt.% methyl butynol | Solution dark purple colored | Black Precipitate Solution Yellow-green, pH about 4.5 |
| 18 | Methylene Chloride Containing Aluminum Coupon, Stabilized with 2.8 Wt.% 1,1-dimethoxyethane | Light Lavender Precipitate | Solution Dark Gray and precipitate present, pH about 4.5 |
| 19 | Methylene Chloride Containing Aluminum Coupon, Stabilized with 2.0 W.% 1,3-Dioxolane | Yellow Green Precipitate | White Precipitate, Solution Yellow, pH about 4.5 |
| 20 | Methylene Chloride Containing Aluminum Coupon, Stabilized with 0.8 Wt.% 1,4-Dioxane | Red precipitate | Pink-Brown precipitate, Solution Colorless, pH about 4.5 |

From Table V it will be readily observed that after 22 hours the methylene chloride without propylene oxide, butylene oxide, diisopropylamine and N-methyl pyrrole had undergone a degradation reaction resulting in a dark orange coloration, evolvement of hydrogen chloride gas and complete loss of utility of the solvent. Examples 16 to 20 inclusive of Table V show that various compounds frequently used as solvent stabilizers are not as effective as the combination of propylene oxide, butylene oxide, diisopropylamine and N-methyl pyrrole in inhibiting degradation of methylene chloride by reaction of aromatic compounds with methylene chloride in the presence of metals, metal salts and combinations thereof.

Although the present invention has been described with detailed reference to specific embodiments thereof, it is not intended to be so limited since modifications and alterations may be made therein which are within the complete intended scope of this invention as defined by the appended claims.

What is claimed is:

1. A stabilized composition consisting essentially of methylene chloride and from about 0.001 to about 2.0 percent by weight of each of diisopropylamine, N-methyl pyrrole, butylene oxide and propylene oxide.

2. The composition of claim 1 wherein diisopropylamine, N-methyl pyrrole, butylene oxide, and propylene oxide are each present in the range of 0.002 to 1.0 percent by weight.

* * * * *